Aug. 29, 1933.  W. LA. HODNEY  1,924,997
COMBINED MIRROR AND TIMEPIECE
Filed June 6, 1931  3 Sheets-Sheet 1
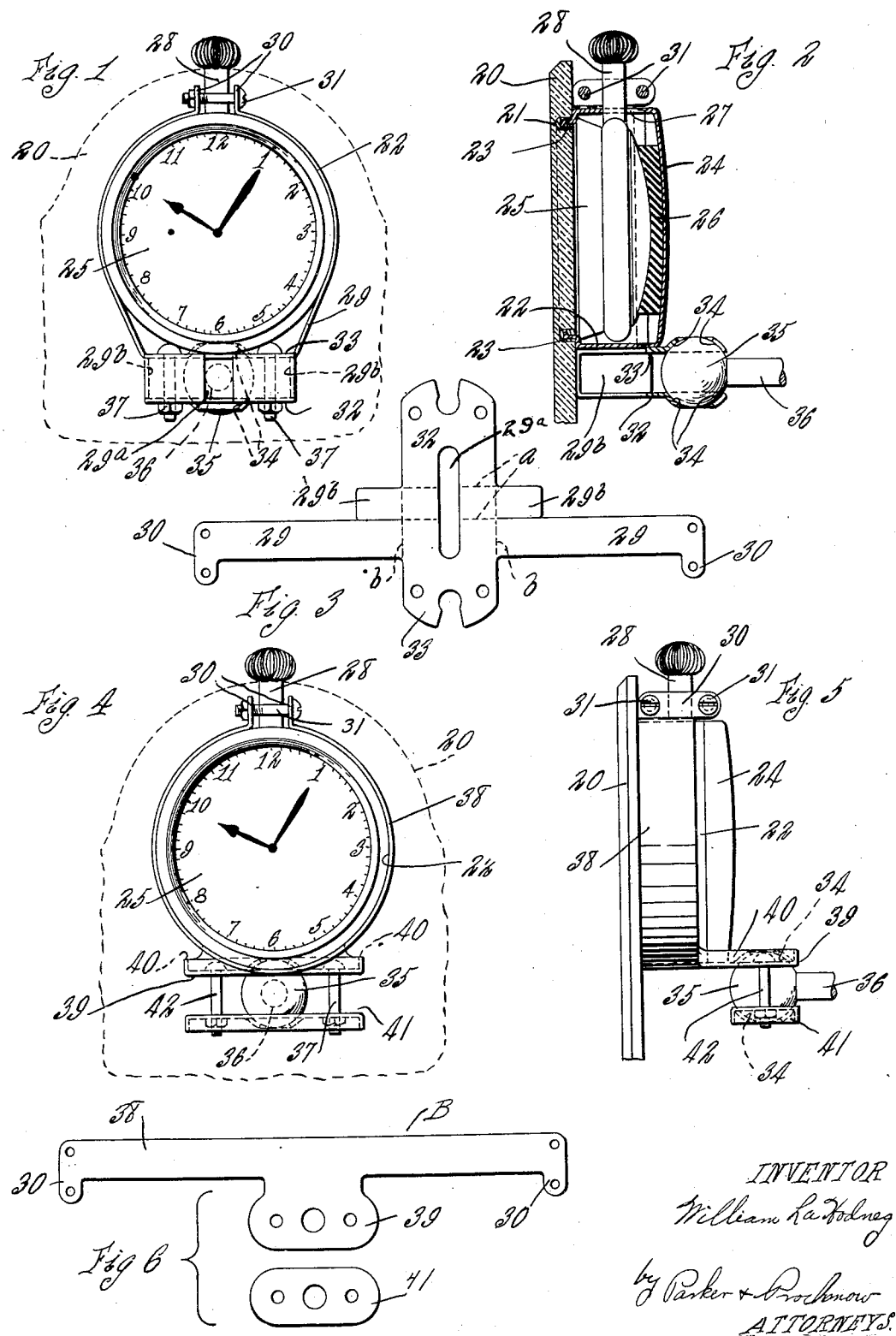

Aug. 29, 1933.  W. LA HODNEY  1,924,997
COMBINED MIRROR AND TIMEPIECE
Filed June 6, 1931   3 Sheets-Sheet 2
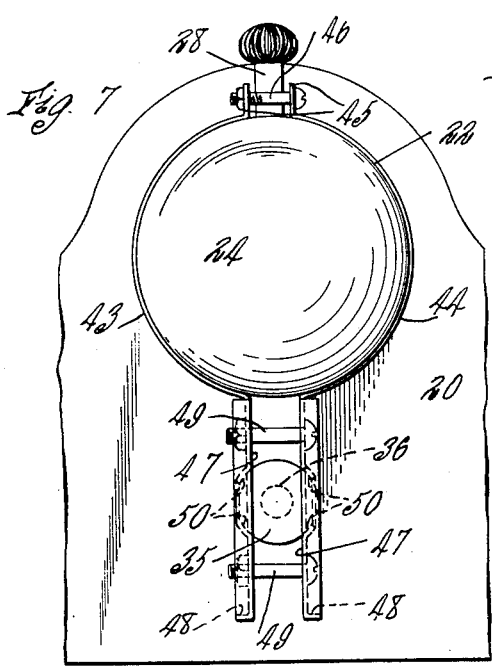
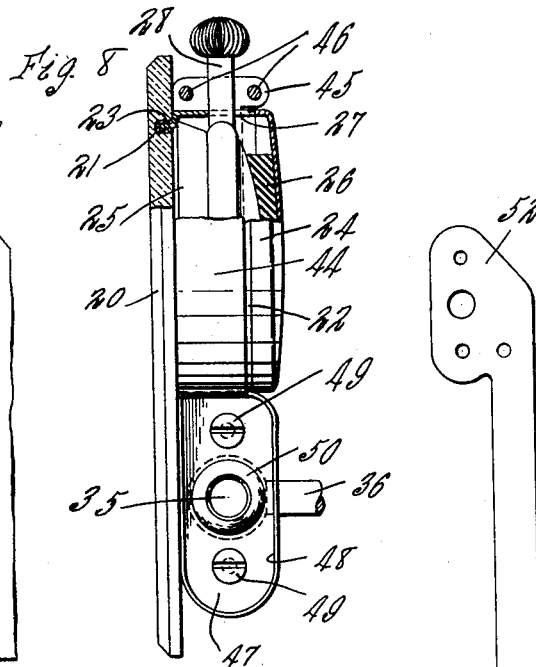
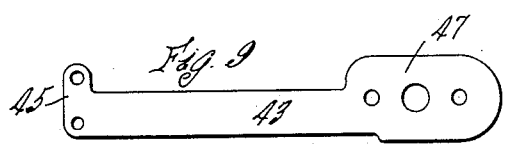
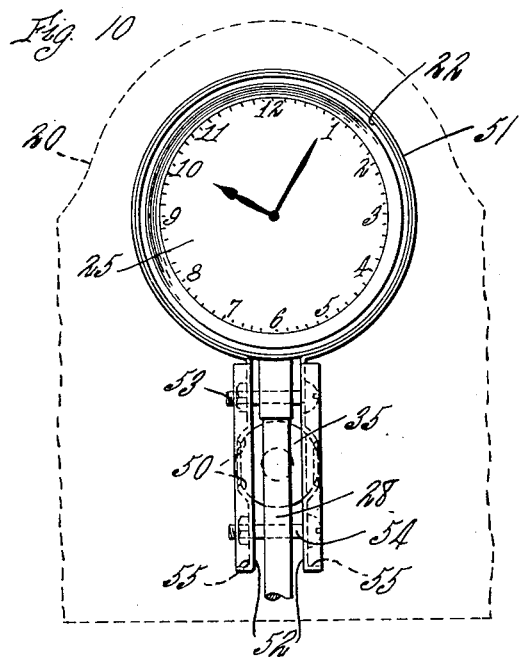
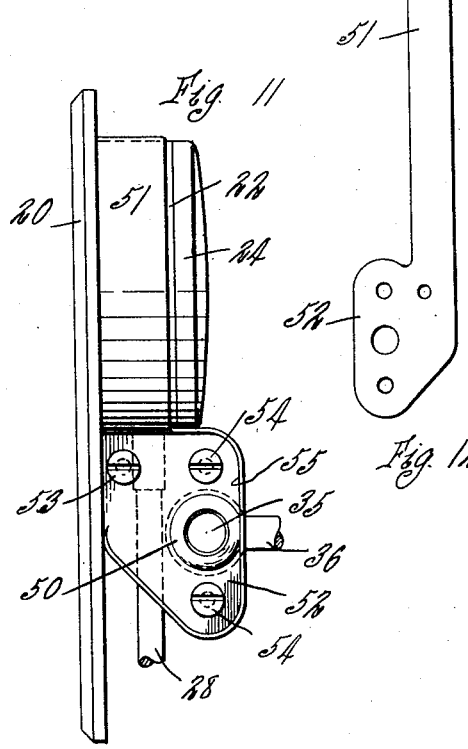
INVENTOR
William La Hodney
by Parker & Crochnow
ATTORNEYS Aug. 29, 1933.  W. LA HODNEY  1,924,997
COMBINED MIRROR AND TIMEPIECE
Filed June 6, 1931   3 Sheets-Sheet 3

INVENTOR
William La Hodney
by Parker & Crochnow
ATTORNEYS.

Patented Aug. 29, 1933

1,924,997

UNITED STATES PATENT OFFICE 1,924,997

COMBINED MIRROR AND TIMEPIECE

William La Hodney, Buffalo, N. Y.

Application June 6, 1931. Serial No. 542,661

14 Claims. (Cl. 45—97)

This invention relates to mounting means and particularly to means for mounting dial instruments upon panels such as rear view mirrors and used in connection with motor vehicles.

An object of the invention is to improve and simplify mounting means of this type.

Another object of the invention is to provide improved means for mounting an instrument such as a time piece at the rear face of the transparent mirror plate in a position such that the dial of the instrument will be visible through a transparent section of the mirror plate; with which the instrument may be easily removed and replaced for cleaning, regulation and repairs; with which the instrument will be enclosed and protected; with which the mirror and instrument will be supported on any suitable part of the vehicle by means which will be largely or entirely confined behind the mirror plate; with which the mirror may be adjusted into different angular positions; which may be formed largely of parts drawn or stamped from sheet metal; and which will be relatively simple, compact, durable, rigid and inexpensive.

Various other objects and advantages will be apparent from the following description of several embodiments of the invention, and the novel features will be particularly pointed out hereinafter in connection with the appended claims.

In the accompanying drawings:

Fig. 1 is a front elevation of mounting means for the mirror plate and the time piece, constructed in accordance with this invention and illustrating one embodiment thereof, the mirror plate being removed, but the position of a part of it with respect to the mounting means is shown by the dash lines;

Fig. 2 is a central, transverse sectional elevation of the same, but with the mirror plate shown;

Fig. 3 is a plan of the blank from which is formed the member that encircles the tubular shell;

Fig. 4 is a view similar to Fig. 1, but illustrating a modification of the construction thereof;

Fig. 5 is a side elevation of the same, but with the mirror plate shown;

Fig. 6 is a plan of the blanks from which are formed the connection between the supporting stud and the tubular shell for this embodiment of the invention;

Fig. 7 is a rear elevation of a rear view mirror and time piece unit also constructed in accordance with this invention, but illustrating still another embodiment thereof;

Fig. 8 is a side elevation of the same but partially in section;

Fig. 9 is a plan of the blank from which is formed one of the parts of the mounting shown in Figs. 7 and 8;

Fig. 10 is a front elevation similar to Figs. 1 and 4 but illustrating still another embodiment of the invention;

Fig. 11 is a side elevation of the same;

Fig. 12 is a plan of the blank from which part of the device of Figs. 10 and 11 is formed;

Figure 13:
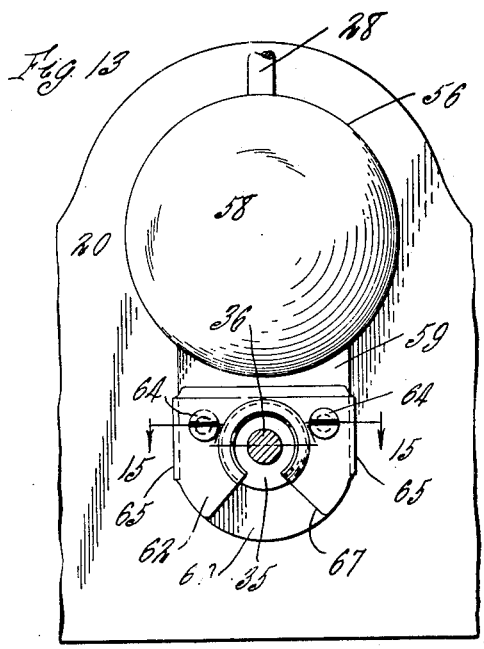
Fig. 13 is a rear elevation of a rear view mirror and time piece, also constructed in accordance with the invention, but illustrating another embodiment thereof.

Referring first to Figs. 1 to 3, the embodiment of the invention therein illustrated includes a transparent mirror plate 20 which may be formed of glass that is polished upon its forward face and coated with the usual reflecting material upon its rear face. An annular groove 21 is formed in the rear face of the plate and is preferably of less depth than the thickness of the plate. A tubular shell 22 of sheet metal is disposed endwise against the rear face of the plate, and at the end abutting the plate is contracted as at 23 and received in said annular groove 21.

The contracted end 23 is anchored in the groove 21 by any suitable means, such as, by filling the remainder of the groove with a suitable cement which has property of adhering to the glass or material of the plate. The end of the contracted end 23 within the groove may have a flange to provide an abutment which is anchored in the cement, to increase the anchorage of the shell to the plate. Various other means for securing the shell to the rear face of the plate may also be utilized.

The shell 22 is provided with a removable rear end or cover 24, and a time piece 25 of suitable construction is removably confined in the shell 22 by the cover 24. A resilient pad 26 may be interposed between the cover 24 and the time piece to press the time piece resiliently against the contracted end of the shell, as shown in Fig. 2. The outer end of the shell is provided with a slot 27 to receive the usual winding and setting stem 28 of the time piece.

A member, band or strip 29 is drawn from a blank of suitable sheet metal, as shown in Fig. 3, and is bent upon the dotted lines *a* and *b* into the shape shown in Figs. 1 and 2. The ends or arms of member 29 which encircle the periphery of the shell 22, are bent laterally at their free ends, as shown in Figs. 1 and 2, to form clamping lugs or ears 30, and suitable clamping means, such as bolts 31, connects these lugs to draw them toward one another and contract the member, band or strip 29 upon the shell 22.

The sections 32 and 33 at opposite side edges of the member 29, after the bending of the blank lie approximately parallel to but spaced from one another, as shown in Fig. 2, and constitute what may be considered as a lateral extension of the member 29 which encircles and is clamped to the shell 22. The ends of the sections 32 and 33 are provided with opposed concave seats 34 which receive between them the spherical head 35 of a supporting stud 36. Bolts 37 connect the sections 32 and 33 at opposite sides of the concave seats 34, so as to draw the sections toward one another and clamp the same to the spherical head 35 with different degrees of friction.

The tongues 29b at opposite side edges of the section 32 are bent into positions between the sections 32 and 33, as shown in Figs. 1 and 2, so as to limit the approach of the sections toward one another at their connected ends, so that the approach of the sections will be confined entirely to the portions having the concave seats. The ends of the portions having the concave seats may be considered as opposing clamp sections which engage with the spherical head 35. The free end of the section 32 may also be considered as a cap section which is drawn toward and from the section 33 for clamping the same to the head 35, and if desired may be formed separately from the blank. The member 29 may also have a slot 29a (Fig. 3) if desired.

It will be observed that the strip, band or member 29 encircles the shell 22 and is tightly clamped thereon, and the sections 32 and 33 of this strap or member, which constitute a lateral extension thereof, are drawn toward one another into clamping engagement of the spherical head 35 of the supporting stud by bolts 37 which are entirely separate from the means which clamps the strip or member 29 to the shell 22. The member 29 is therefore a connecting member between the stud 36 and the shell 22, is entirely concealed by the mirror plate, and has a universal mounting on the stud 36. The shell 22 in turn supports the time piece and the mirror plate. This forms a very simple, practical and inexpensive support, by which the mirror plate and time piece are supported, and adjusted universally into different angular positions.

Referring now to Figs. 4, 5 and 6, the embodiment of the invention therein illustrated is similar in many respects to the form of the invention shown in Figs. 1 to 3, and parts which are the same as in Figs. 1 to 3 will be designated by the same reference characters without further detailed description. The strip, band or member 38 is formed from the blank B, shown in Fig. 6, and encircles the shell 22 and is clamped thereto by bolts 31 as in Figs. 1 and 2.

The member 38 has a lateral extension 39 extending rearwardly, and which corresponds largely to the section 33 of Figs. 1 to 3, except that the extension 39 is flanged upwardly along its periphery, as shown at 40, to give the extension resistance against flexing. A cap piece or plate 41, flanged peripherally to resist flexing, is connected to the extension 39 by bolts 42, and corresponds to the section 32 of Figs. 1 to 3, except that it is separable from the member 38. The extension 39 and its cap plate 41 have opposing, concave seats which are clamped upon the spherical head 35 of the supporting stud 36, to provide a universal frictional mounting between the stud and the strap or member 38.

Referring now to Figs. 7, 8 and 9, the form of the invention therein illustrated differs from the form shown in Figs. 1 to 6 in the details of the strap or member which encircles the shell and connects it to the supporting stud. Parts which are the same as in Figs. 1 to 6 are given the same reference characters. The member or strap which encircles the shell 22 is formed of two sections 43 and 44, the blank for one of said sections being shown in Fig. 9. Such sections 43 and 44 extend around opposite parts of the shell periphery, and at their upper ends are provided with lateral flanges 45 which are connected together adjustably by bolts 46. The lower ends of the sections 43 and 44 are also flanged laterally, as at 47 to provide the universal connection to the spherical head 35 of the supporting stud 36.

The flanges 47 comprise a lateral extension of the shell encircling member and extend approximately parallel to, but are spaced from, one another, and their peripheries are provided with flanges 48 to resist flexure. Bolts 49 connect the flanges 47, and between the bolts the flanges 47 are apertured and have the parts surrounding the aperture drawn to form concave seats 50 opposing one another and frictionally engaging the spherical head 35 of the supporting stud 36. The bolts 49 may first be adjusted to give the desired frictional engagement with the spherical head 35, and then the bolts 46 may be adjusted to give the desired clamping action of the strap sections 43 and 44 upon the shell 22.

Referring now to Figs. 10, 11 and 12, the form of the invention therein illustrated is similar to that shown in Figs. 7 to 9, except that the ears 45 and the bolts 46 are omitted and the strap sections encircling the shell 22 are integral. In this form of the invention the blank, from which the strap or member 51 which engages the shell 22 is formed, is shown in Fig. 12 before the ends are flanged for stiffening purposes. This strap or band 51 encircles the shell 22 and its free ends are provided with laterally and rearwardly extending flanges 52 which extend approximately parallel to and are spaced from one another, and may also be considered as a lateral extension of the member 51. These flanges 52 are connected by a bolt 53 immediately adjacent the shell 22, and this bolt when tightened contracts the strap, band or member 51 upon the shell 22.

The rearwardly extending portions of the flanges 52 are connected by bolts 54, are provided with peripheral ribs 55 to stiffen them against flexing, and between the bolts 54 the flanges 52 are apertured. The portions surrounding the apertures are drawn to form concave seats corresponding to the segment of a sphere. The concave seats face one another and receive and frictionally engage the spherical head 35 of the supporting stud 36. By tightening the bolts 54, the friction created on the spherical head 35 may be varied as desired, and this variation is separate from and in addition to the adjustment of the member 51 on the shell through the tightening or loosening of the bolt 53. In this form of the invention, the winding and setting stem 28 of the time piece may depend between the flanges 52.

Figure 14:
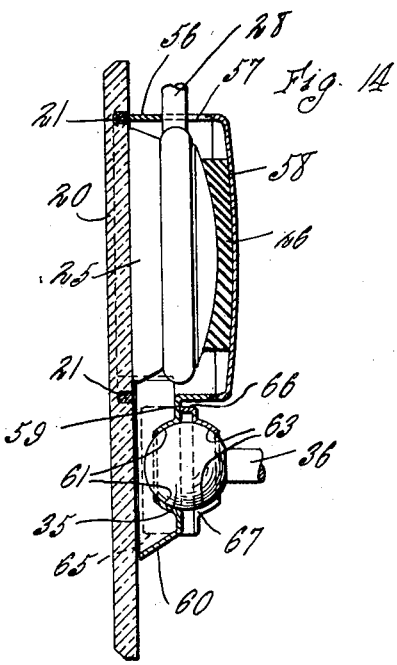
Fig. 14 is a central, sectional elevation of the same.
Figure 15:
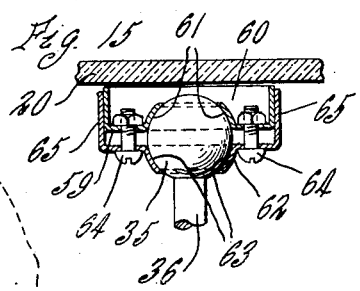
Fig. 15 is a sectional plan through a part of the same, the section being taken approximately along the line 15—15 of Fig. 13.

Referring next to Figs. 13, 14 and 15, the form of the invention therein illustrated includes the tubular or cup-shaped shell 56 which is similar, in its general function, to the shells 22 of Figs. 1 to 12. The shell 56, however, in this example, does not have the contracted end which is anchored in the annular groove 21 of the plate 20, but is cylindrical in shape with its open end received and cemented directly in the annular groove 21. The rear end of the shell 56 is provided with a slot 57 to receive the winding and setting stem 28 of the time piece 25, and the rear end is normally closed by a cap 58, corresponding to the cap 24, which is removably snapped upon the shell, as in Figs. 1 to 12. A resilient cushion or pad 26 may be interposed between the removable cover 58 and the time piece 25, as in Figs. 1 to 12.

A section 59 is struck downwardly out of the lower part of the forward end of the shell 56, and its extreme forward end is provided with a flange 60 which extends into proximity to the rear face of the plate 20. The struck out section 59 is provided with an aperture surrounded by a concave seat 61, which is in the form of a spherical segment. A cap plate 62 is also provided with an aperture surrounded by a concave seat 63 in the form of a spherical segment, and the spherical head 35 of the supporting stud 36 is received and clamped between the seats 61 and 63. Bolts 64 connect the cap plate 62 to the struck out section 59 on opposite sides of the spherical head and the cap plate 62 is provided with side flanges 65 which extend along the sides of the section 59 so as to guide the cap plate forwardly and rearwardly.

The cap plate may also have a flange 66 which engages against the rear face of the section 59 when the plate 62 is drawn tighter against the spherical head 35. The cap plate 62 is also provided, in its lower edge, with a slot 67 leading to the aperture at the center of the spherical seat 63, so as to permit of movement of the stem of the stud 36 into the aperture at the center of the seat 63, as shown in Figs. 13 to 15. The section 59 and the cap plate 62 together comprise a lateral extension of the shell which is attached to the mirror plate. In forming the shell 56, it is first made longer than the final shell, the extension 59 is then struck out to form the lateral section, as shown in Fig. 14, and then the remaining periphery of the forward end of the shell is cut off to the desired dimensions, shown in Fig. 14.

Figure 16:
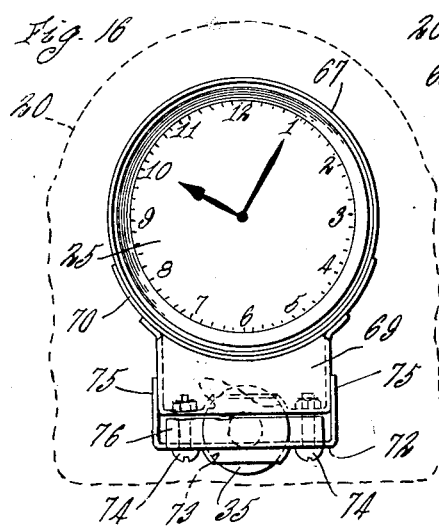
Fig. 16 is a front elevation similar to Figs. 1, 4 and 10 but illustrating still another embodiment of the invention.
Figure 17:
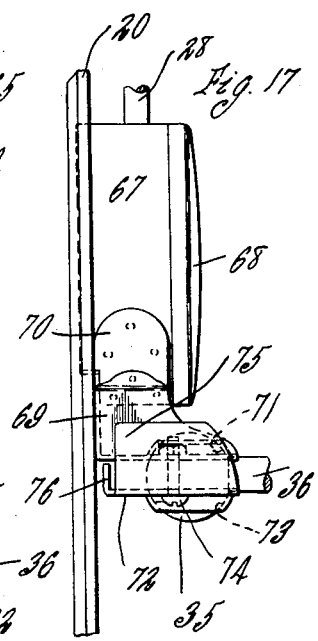
Fig. 17 is a side elevation of the same, but with the mirror plate attached.

Referring now to Figs. 16 and 17, the form of the invention therein shown includes a tubular shell 67 with the removable snap cover 68 at its rear end, and at its forward end is cemented or secured in the annular groove 21, as in the other forms of the invention. A lateral extension 69 in the form of a sheet metal die stamping is secured, such as by soldering or spot welding, to an arcuate strap 70 which in turn is secured, such as by spot welding, to the periphery of the shell 67.

The lateral extension 69 is provided on its lower face with an aperture surrounded by a concave seat 71, facing downwardly, and with a cap plate 72 having an opposing concave seat 73 and connected to the lower face of the extension 69 by bolts 74. By tightening the bolts 74 the cap plate 72 is drawn toward the seat 71 so as to clamp the spherical head 35 of the supporting stud frictionally and adjustably between the seats 71 and 73. The cap plate 72 may have flanges 75 which slidingly engage with the side edges of the extension 69 to limit sidewise movement of the cap plate, and may also have a flange 76 along its forward edge to limit the movement of the forward edge of the cap plate toward the extension 69.

Figure 18:
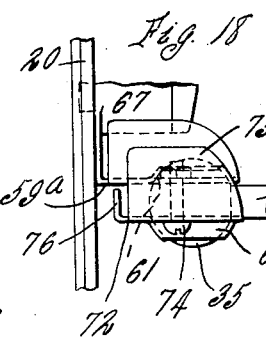
Fig. 18 is a similar side elevation, but illustrating a slight modification thereof.
Figure 19:
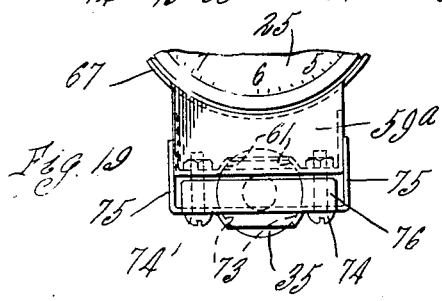
Fig. 19 is a front elevation of the same, with the mirror plate removed.

Referring now to Figs. 18 and 19, the form of the invention therein illustrated is similar to that of Figs. 13 to 15, except that the integral struck out extension 59a is bent downwardly and then rearwardly, so that its concave seat 61 will face downwardly, instead of rearwardly as in Fig. 14. The cap plate 72 is the same as in Figs. 16 and 17.

From the foregoing description it will be observed that the means for supporting the mirror plate and dial instrument from the supporting stud 36 is largely formed of sheet metal die stampings, which are relatively inexpensive and light in weight, yet possessing the desired rigidity and strength and permitting the removal and replacement of the time piece without difficulty.

It will be obvious that various changes in the details, which have been herein described and illustrated in order to explain the nature of the invention, may be made by those skilled in the art within the principle and scope of the invention as expressed in the appended claims.

I claim:

1. Mounting means comprising a plate, a tubular shell attached to and extending approximately normal to a face thereof, a sheet metal member extending laterally from said shell along a face of said plate and having a concave seat drawn therein, a supporting stud having a spherical head engaged in said seat, a cap plate having a concave seat also engaging said head and confining it to said member, and means for drawing said plate against said member to clamp said head between said seats with various degrees of friction, whereby said plate and shell will be supported entirely from said stud and may be adjusted into different angular positions thereon.

2. Mounting means comprising a plate, a tubular shell abutting against and attached to the interior area of a face thereof, and formed to receive and mount an instrument, a member stamped from sheet metal of uniform thickness and attached to said shell and having a laterally extending portion approximately abutting said plate with sections adjustable toward and from one another, means connecting said sections for drawing them toward one another, and a stud having a head clamped between said sections, whereby said plate and shell will be supported entirely from said stud.

3. Mounting means comprising a plate, a tubular shell secured to said plate at the rear face thereof, a member stamped from sheet metal encircling said shell and removably clamped thereto, said member having a lateral extension with portions thereof adjustable toward and from one another, and a stud having a head received and clamped between said adjustable portions.

4. Mounting means comprising a plate, a tubular shell secured to said plate at the rear face thereof and having an aperture at the face abutting said plate, a member stamped from sheet metal encircling said shell and removably clamped thereto, said member having a lateral extension of sheet metal with portions thereof adjustable toward and from one another, a stud having a head received and clamped between said adjustable portions and means passing directly between said portions and separate from the means which clamps said member to the shell of the case for drawing said portions toward one another.

5. Mounting means comprising a plate, a tubular shell having an open end secured to said plate at the rear face thereof so as to constitute a rearward extension thereof, a band of stamped sheet metal encircling the periphery of said shell, means for drawing the ends of said band together to tightly clamp it to said shell, said band having an extension at one side of the shell, with portions spaced apart and adjustable toward one another and having means in addition to said tightening means for drawing said portions toward one another, and a stud having a head received between said portions whereby said shell will be supported from said head and said plate from said shell.

6. Mounting means comprising a plate, a tubular shell attached to said plate at the rear face thereof, stamped sheet metal means encircling said shell and secured thereto by contraction, said means including a laterally extending portion having a drawn concave seat and a cap plate having an opposed drawn seat, a stud having a head clamped between said seats, and means passing between said cap means and said laterally extending portion for clamping said head between said seats.

7. Mounting means comprising a plate, a tubular shell attached to said plate at the rear face thereof, a sheet metal band encircling said shell, means for drawing the ends of said band toward one another to clamp it to said shell, said band having portions extending therefrom and bent to form opposing clamp sections, means for drawing said clamp sections toward one another, and a stud having a head received between said clamp sections and to which said sections are clamped, whereby said shell is supported from said stud and said plate from said shell.

8. Mounting means comprising a plate, a tubular shell attached to said plate at the rear face thereof, a split band of sheet metal encircling said shell, means for drawing the ends of said band toward one another to contract and clamp it to said shell, each end of said band also having an extension with a drawn concave seat formed therein and facing the extension of the other end, a stud having a head received between said seats, and means in addition to said tightening means for drawing said extensions toward one another and clamping them to said head.

9. Mounting means comprising a plate, a tubular shell attached to said plate at the rear face thereof, a band of flexible material encircling said shell, means for drawing the ends of said band toward one another to contract the band on said shell, the free ends of said band having lateral extensions therefrom, a stud having an end received between said extensions, and means in addition to said clamping means for securing said extensions to said stud, whereby said shell will be supported from said stud and said plate will be supported from said shell.

10. Mounting means comprising a plate, a tubular shell attached to said plate at the rear face thereof, a sheet metal member encircling said shell as a band, means for contracting said member on said shell, said member having a laterally extending portion formed of two sections adjustable toward one another, said sections having cooperating drawn concave seats and means for drawing said sections toward one another, a stud having a spherical head confined between said seats, and clamped therebetween with different degrees of friction, said sections having ribs drawn therefrom to resist flexure.

11. Mounting means, comprising a tubular shell, a strip of sheet metal encircling said shell while flat against the periphery of the shell, and having flanged ears at the approximately meeting ends, means for drawing said ears together to clamp said strip to said shell, said strip having a laterally extending ear, and drawn to form a concave seat in a face thereof, a stud from which said shell is entirely supported having a spherical head resting in said seat, and means attached to said ear and engaging with the portion of said head approximately opposite from the concave seat for confining said head in said seat and completing the connection by which said shell is supported from said stud.

12. Mounting means, comprising a tubular shell, a pair of sheet metal strips disposed flatwise along opposite sides of said shell, and extending toward one another in an encircling direction, means for clamping adjustably together one set of adjacent ends of said strips, the opposite ends of said strips which are adjacent one another being bent laterally and having drawn concave seats in their opposing faces, clamping means connecting said opposite ends and adjustable to draw them toward one another, and a supporting member having a ball-like head which is confined between said seats and frictionally held against movement therein and entirely supporting said shell therefrom.

13. Mounting means, comprising a tubular shell, a strip of sheet metal encircling said shell as a belt in a peripheral direction, and having its ends flanged laterally in a direction parallel to one another, means for drawing said flanged ends toward one another to tighten said strip upon said shell, said flanged ends also having concave seats drawn therein in their opposing faces, a member having a ball-like head which is disposed between said seats, and entirely supports said shell and means for drawing said flanged ends toward one another in a manner to clamp said head frictionally in said seats and hold said shell in different angularly adjustable positions on said head.

14. Mounting means comprising a tubular shell, a band encircling the periphery of said shell, and having flanged ends extending laterally away from the shell and spaced apart, means connecting said flanged ends for tightening said band upon said shell so as to clamp it thereto, said flanged ends extending laterally from the shell beyond said tightening means, and having aligned concave seats formed in opposing faces, means connecting the free ends of said flanged ends for drawing them together, and causing said concave seats to approach, and a supporting member having a ball-like head which is disposed between said opposing seats and frictionally clamped to said flanged ends by which said shell is entirely supported for angular movement into different adjusted positions.

WILLIAM LA HODNEY.